(12) United States Patent
Williams et al.

(10) Patent No.: US 11,436,124 B2
(45) Date of Patent: Sep. 6, 2022

(54) APPARATUS AND METHOD FOR ACCESSING METADATA WHEN DEBUGGING A DEVICE

(71) Applicant: Arm Limited, Cambridge (GB)

(72) Inventors: Michael John Williams, Ely (GB); John Michael Horley, Hauxton (GB)

(73) Assignee: Arm Limited, Cambridge (GB)

( * ) Notice: Subject to any disclaimer, the term of this patent is extended or adjusted under 35 U.S.C. 154(b) by 95 days.

(21) Appl. No.: 16/966,981

(22) PCT Filed: Jan. 17, 2019

(86) PCT No.: PCT/GB2019/050129
§ 371 (c)(1),
(2) Date: Aug. 3, 2020

(87) PCT Pub. No.: WO2019/166762
PCT Pub. Date: Sep. 6, 2019

(65) Prior Publication Data
US 2020/0394119 A1 Dec. 17, 2020

(30) Foreign Application Priority Data
Feb. 27, 2018 (GB) ..................................... 1803179

(51) Int. Cl.
*G06F 11/36* (2006.01)
*G06F 11/14* (2006.01)
(Continued)

(52) U.S. Cl.
CPC ...... *G06F 11/3656* (2013.01); *G06F 11/1435* (2013.01); *G06F 11/3037* (2013.01);
(Continued)

(58) Field of Classification Search
CPC ............. G06F 11/3648; G06F 11/3656; G06F 11/3664; G06F 11/1435; G06F 11/3037;
(Continued)

(56) References Cited

U.S. PATENT DOCUMENTS 5,287,511 A * 2/1994 Robinson ................ G06F 13/28
717/106
6,202,172 B1 3/2001 Ponte
(Continued)

FOREIGN PATENT DOCUMENTS

| EP | 0 652 516 | 5/1995 |
|---|---|---|
| GB | 2493405 | 2/2013 |
| GB | 2549511 | 10/2017 |

OTHER PUBLICATIONS

Williams, Michael, ARMv8 Debug And Trace Architectures, Proceedings of the 2012 System, Software, SoC and Silicon Debug Conference, Sep. 19-20, 2012, 6 pages, [retrieved on Apr. 25, 2022], Retrieved from the Internet: <URL:http://ieeexplore.ieee.org/>.*

(Continued)

*Primary Examiner* — Geoffrey R St Leger
(74) *Attorney, Agent, or Firm* — Nixon & Vanderhye P.C.

(57) ABSTRACT

To access metadata when debugging a device, debug access port circuitry including a debug interface receives commands from a debugger, and a bus interface coupled to a bus enables the debugger to access a memory system of the device. The device operates on data granules having associated metadata items, and the bus interface enables communication of both the data granules and the metadata items over the bus. The debug access port circuitry has storage elements accessible via the commands issued from the debugger, such that the accesses performed within the memory system via the bus interface are controlled in dependence on the storage elements accessed by the commands. A metadata storage element stores metadata items, (Continued)

and the debug access port circuitry is responsive to a command from the debugger to perform a memory direct access to transfer metadata items between the metadata storage element and the memory system.

22 Claims, 16 Drawing Sheets

(51) Int. Cl.
    *G06F 11/30*     (2006.01)
    *G06F 13/40*     (2006.01)
    *G06F 13/42*     (2006.01)

(52) U.S. Cl.
    CPC ...... *G06F 11/3664* (2013.01); *G06F 13/4068* (2013.01); *G06F 13/4221* (2013.01)

(58) Field of Classification Search
    CPC .. G06F 13/4068; G06F 13/4221; G06F 13/28; G06F 2213/3602
    See application file for complete search history.

(56) References Cited

U.S. PATENT DOCUMENTS

| | | | |
|---|---|---|---|
| 7,269,718 | B2 | 9/2007 | Alexander, III et al. |
| 10,078,113 | B1* | 9/2018 | Usgaonkar ....... G01R 31/31705 |
| 2002/0087918 | A1 | 7/2002 | Miura et al. |
| 2009/0222692 | A1* | 9/2009 | Robertson ........... G06F 11/3648 714/25 |
| 2010/0192026 | A1* | 7/2010 | Abadi ..................... G06F 11/08 714/53 |
| 2014/0095932 | A1* | 4/2014 | Mangano ................ G06F 11/27 714/30 |
| 2014/0173378 | A1* | 6/2014 | O'Connor ........... G06F 11/1048 714/758 |
| 2014/0201403 | A1* | 7/2014 | Sato ........................ G06F 13/28 710/107 |
| 2017/0344512 | A1* | 11/2017 | Jen ...................... G06F 13/4282 |

OTHER PUBLICATIONS

Lee, Yongje, et al., Towards a practical solution to detect code reuse attacks on ARM mobile devices, HASP '15: Proceedings of the Fourth Workshop on Hardware and Architectural Support for Security and Privacy, Jun. 2015, pp. 1-8, [retrieved on Apr. 25, 2022], Retrieved from the Internet: <URL:http://dl.acm.org/>.*
International Search Report for PCT/GB2019/050129, dated May 16, 2019, 3 pages.
Written Opinion of the ISA for PCT/GB2019/050129, dated May 16, 2019, 8 pages.
Combined Search and Examination Report for GB1803179.9, dated Aug. 23, 2018, 6 pages.

* cited by examiner

```
CAPABILITIES (1 bit of metadata for each 16 bytes of data)
Addr   | Data
0x1000:  16 bytes of data, 1 bit of metadata
0x1010:  16 bytes of data, 1 bit of metadata
0x1020:  16 bytes of data, 1 bit of metadata ALLOCATION TAGGING (4 bits of metadata for each 16 bytes of data)
Addr   | Data
0x1000:  16 bytes of data, 4 bits of metadata
0x1010:  16 bytes of data, 4 bits of metadata
0x1020:  16 bytes of data, 4 bits of metadata
```

FIG. 8B

APPARATUS AND METHOD FOR ACCESSING METADATA WHEN DEBUGGING A DEVICE

This application is the U.S. national phase of International Application No. PCT/GB2019/050129 filed 17 Jan. 2019, which designated the U.S. and claims priority to GB Patent Application No. 1803179.9 filed 27 Feb. 2018, the entire contents of each of which are hereby incorporated by reference.

The present disclosure relates to a technique for accessing metadata when debugging a device.

The device can take a variety of forms, and may for example include one or more processing circuits such as central processing units (CPUs) for performing data processing operations on data held within a memory system of the device.

The device may be arranged to operate on data formed of data granules having associated metadata items. The size of the data granules may vary dependent on implementation, and indeed the size of the metadata items associated with each data granule may also vary dependent on implementation.

When performing debugging operations in respect of the device, for example to debug a program to be executed on one of the processing circuits, the debugger at certain points in time may wish to access one or more metadata items relating to corresponding data granules. For example, it may be desired to read the values of each of those metadata items. Alternatively, it may be desired to perform a write operation to update the current value of each of those metadata items.

The processing circuitry of the device may support performance of a metadata access operation to access one or more metadata items, and accordingly the debugger could issue a command to the processing circuitry to cause it to perform such a metadata access operation when the debugger wishes to access metadata.

However, this may require halting the current operations being performed by the processing circuitry in order to support the debugger in accessing the metadata items of interest. It would be desirable to provide an improved mechanism for accessing metadata items during the debugging of the device.

In a first example arrangement, there is provided debug access port circuitry comprising: a debug interface to receive commands from a debugger; a bus interface to couple to a bus to enable the debugger to access a memory system of a device, the device operating on data formed of data granules having associated metadata items, and the bus interface enabling communication of both the data granules and the metadata items over the bus between the memory system and the bus interface; a plurality of storage elements accessible via the commands issued from the debugger, such that the accesses performed within the memory system via the bus interface are controlled in dependence on the storage elements accessed by the commands; at least one of the storage elements comprising a metadata storage element to store a plurality of metadata items; and wherein the debug access port circuitry is responsive to at least one command from the debugger to perform an access to the memory system in order to transfer at least one of the plurality of metadata items between the metadata storage element and the memory system.

In another example arrangement, there is provided a method of operating debug access port circuitry comprising: receiving commands from a debugger; providing a bus interface to couple to a bus to enable the debugger to access a memory system of a device, the device operating on data formed of data granules having associated metadata items, and the bus interface enabling communication of both the data granules and the metadata items over the bus between the memory system and the bus interface; providing a plurality of storage elements accessible via the commands issued from the debugger, such that the accesses performed within the memory system via the bus interface are controlled in dependence on the storage elements accessed by the commands; providing at least one of the storage elements as a metadata storage element to store a plurality of metadata items; and performing, in response to at least one command from the debugger, an access to the memory system in order to transfer at least one of the plurality of metadata items between the metadata storage element and the memory system.

In a yet further example configuration, there is provided debug access port circuitry comprising: debug interface means for receiving commands from a debugger; bus interface means for coupling to a bus to enable the debugger to access a memory system of a device, the device operating on data formed of data granules having associated metadata items, and the bus interface means enabling communication of both the data granules and the metadata items over the bus between the memory system and the bus interface means; a plurality of storage element means accessible via the commands issued from the debugger, such that the accesses performed within the memory system via the bus interface means are controlled in dependence on the storage element means accessed by the commands; at least one of the storage element means comprising a metadata storage element means for storing a plurality of metadata items; and wherein the debug access port circuitry is responsive to at least one command from the debugger to perform an access to the memory system in order to transfer at least one of the plurality of metadata items between the metadata storage element means and the memory system.

The present technique will be described further, by way of illustration only, with reference to examples thereof as illustrated in the accompanying drawings, in which.

Figure 1:
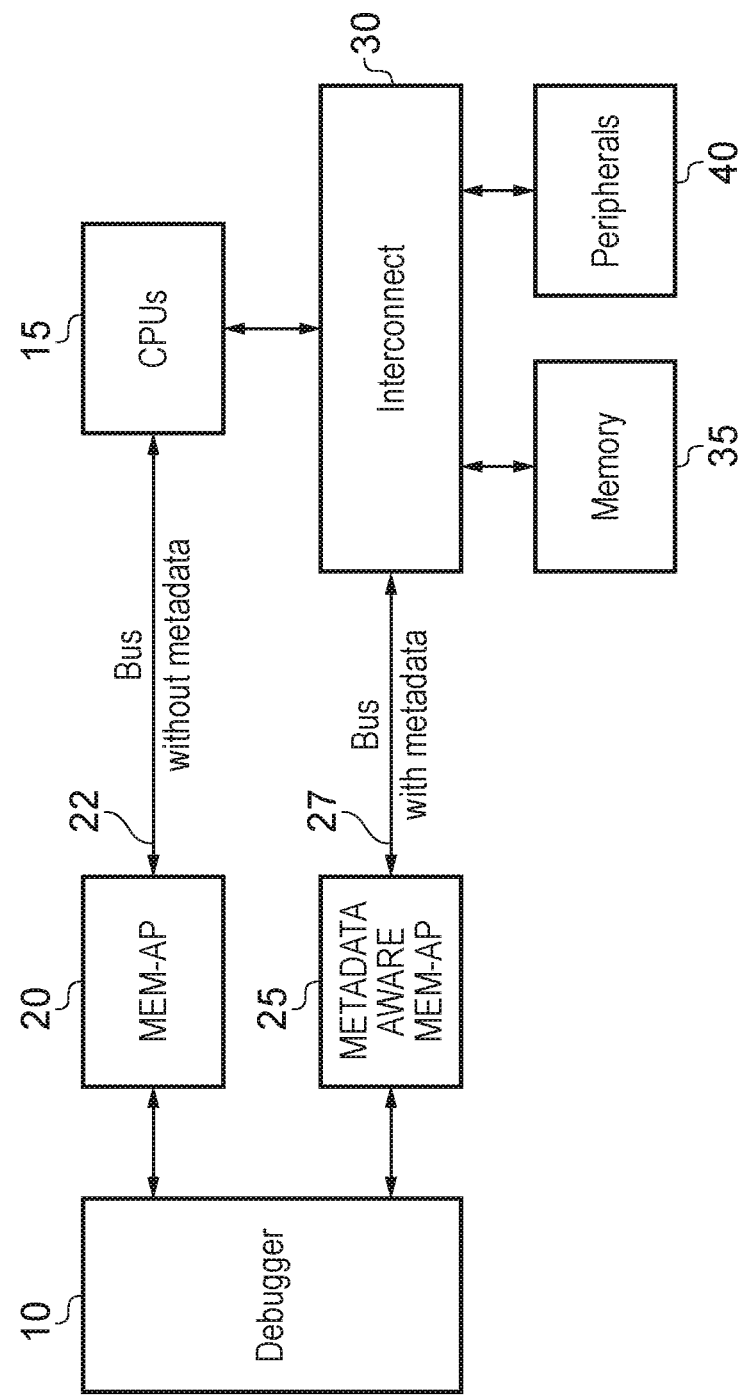
FIG. 1 is a block diagram of a system in accordance with one example.
Figure 3A:
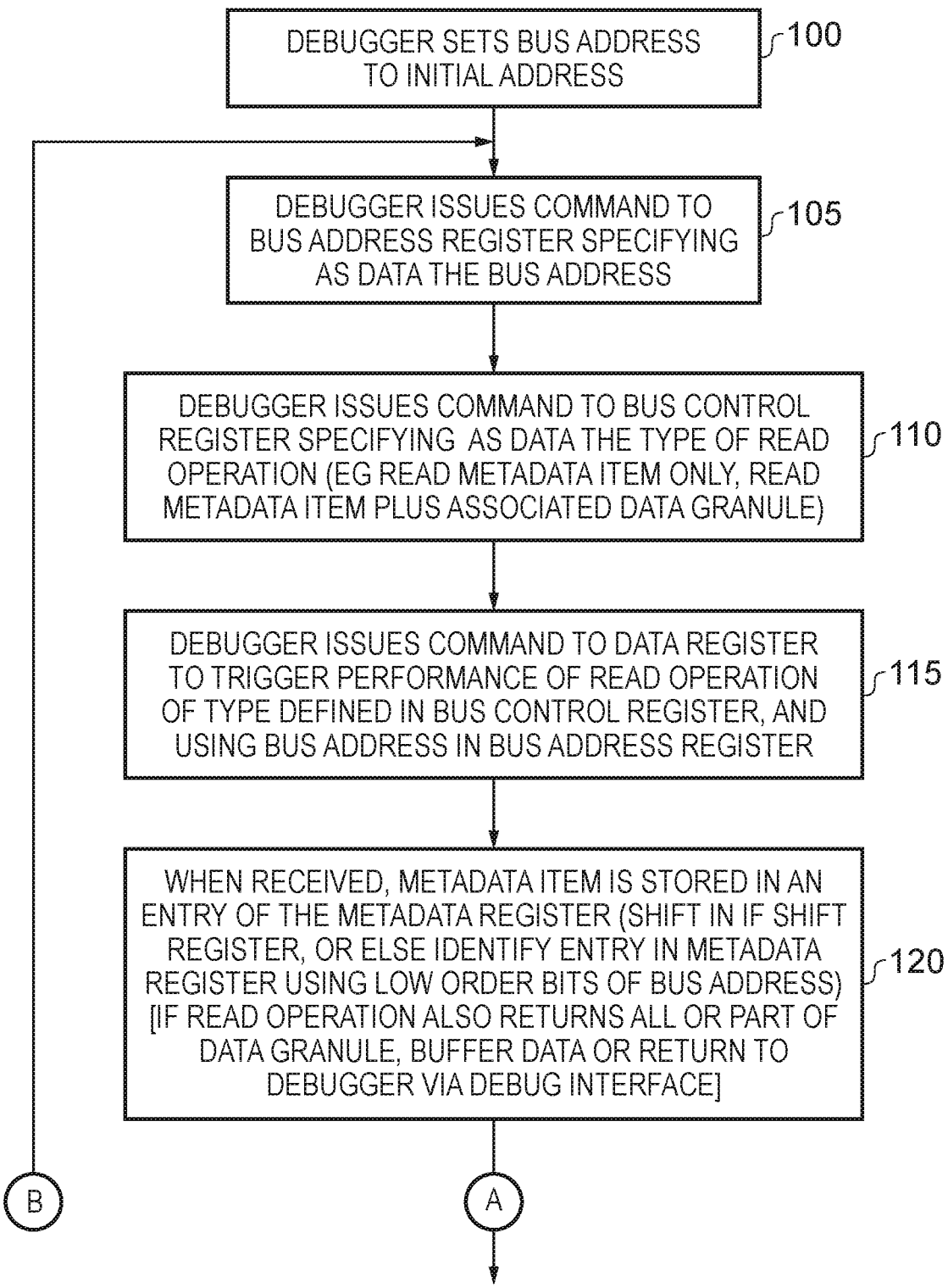
Figure 3B:
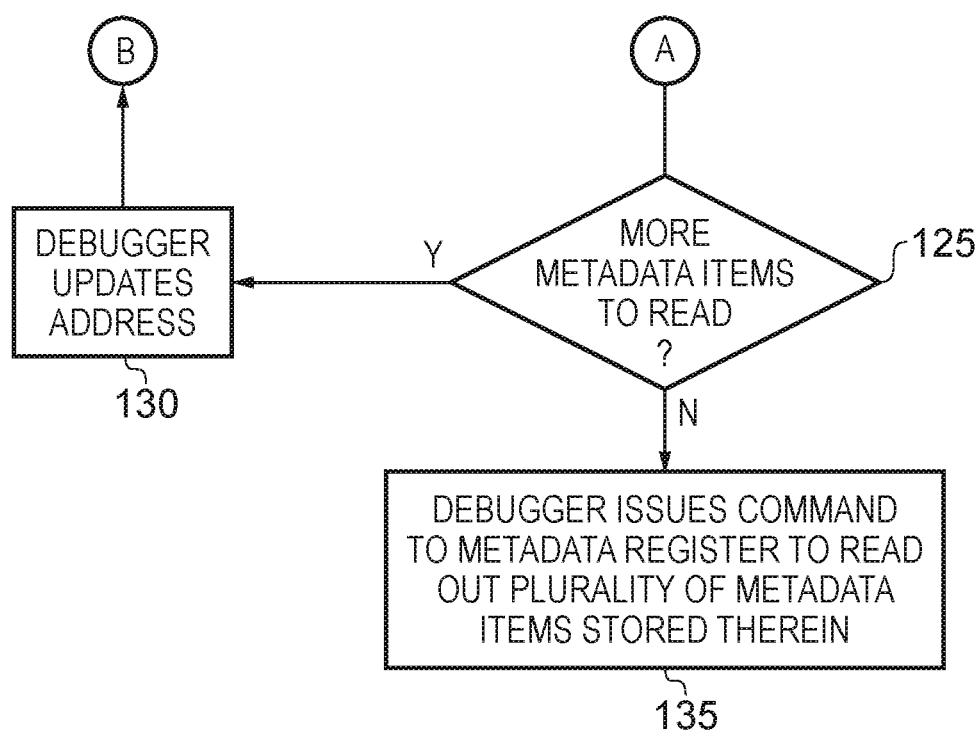
Figure 4A:
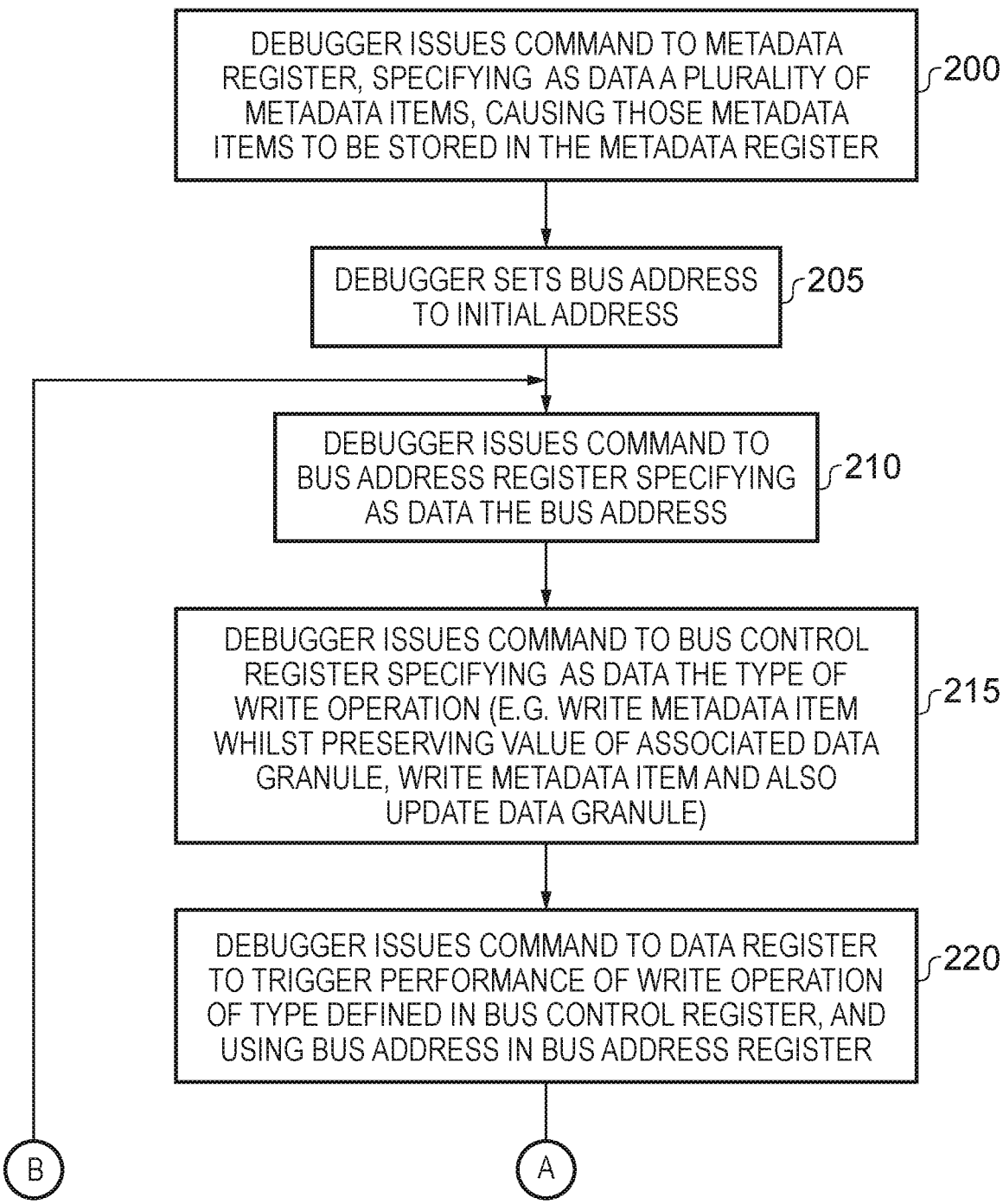
Figure 4B:
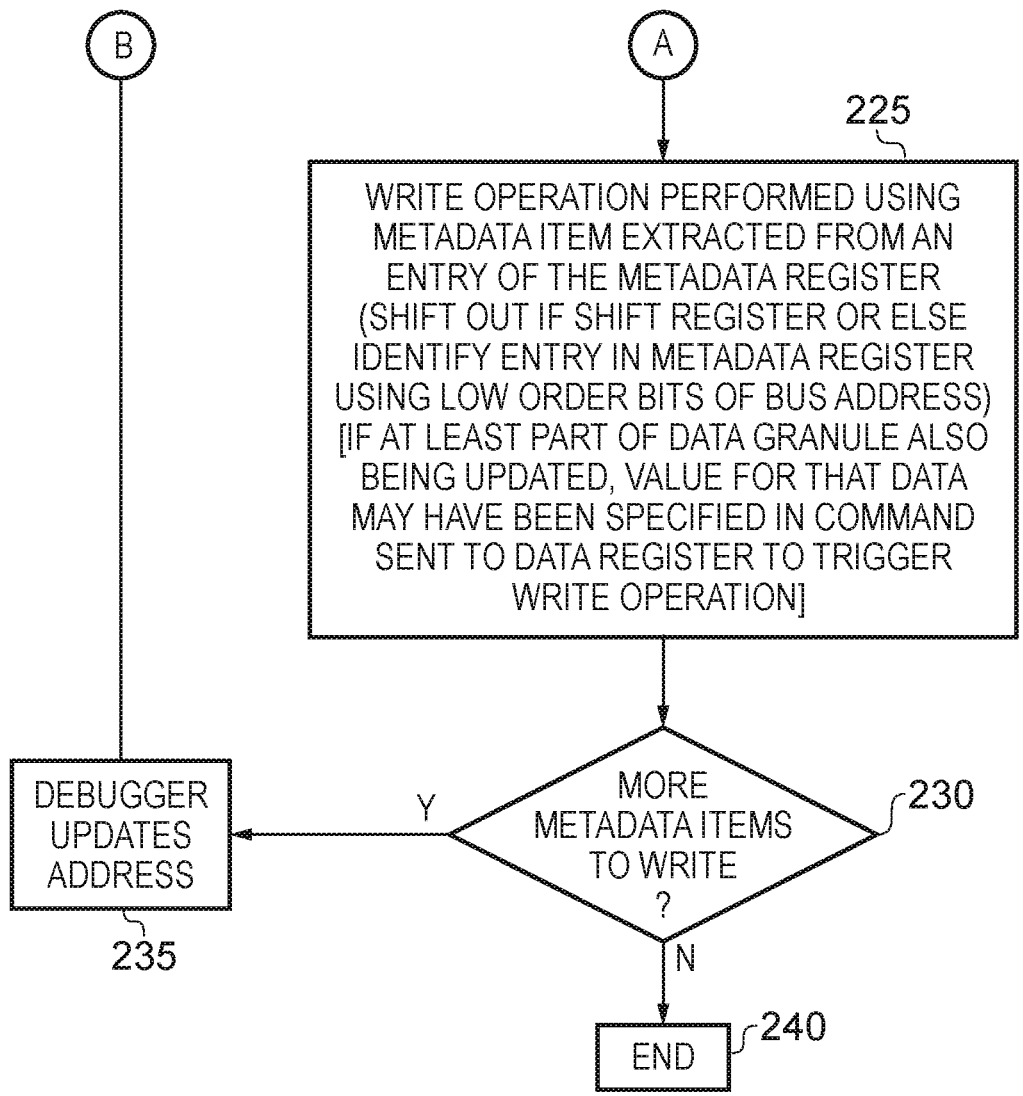
Figure 5:
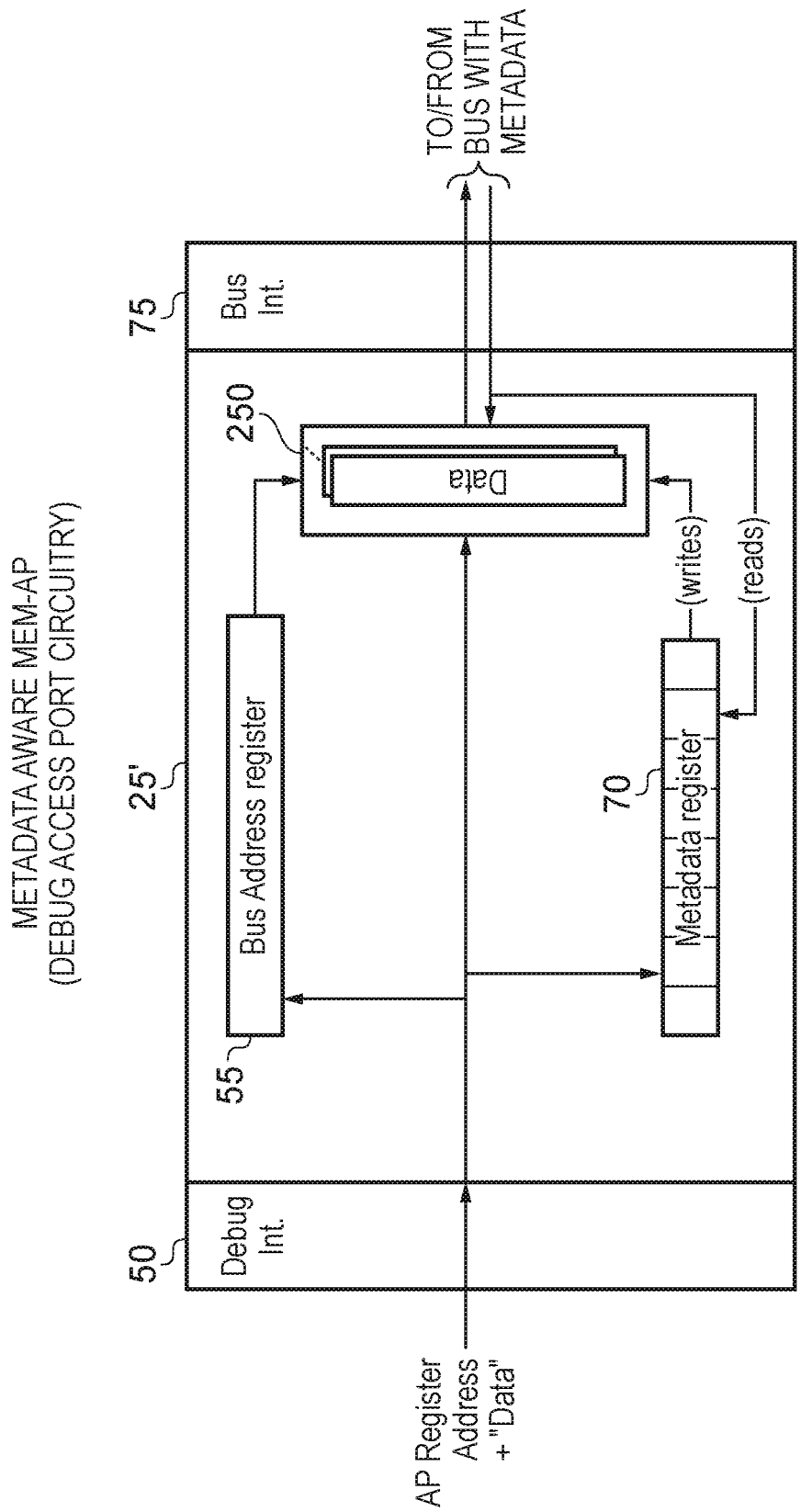
Figure 6A:
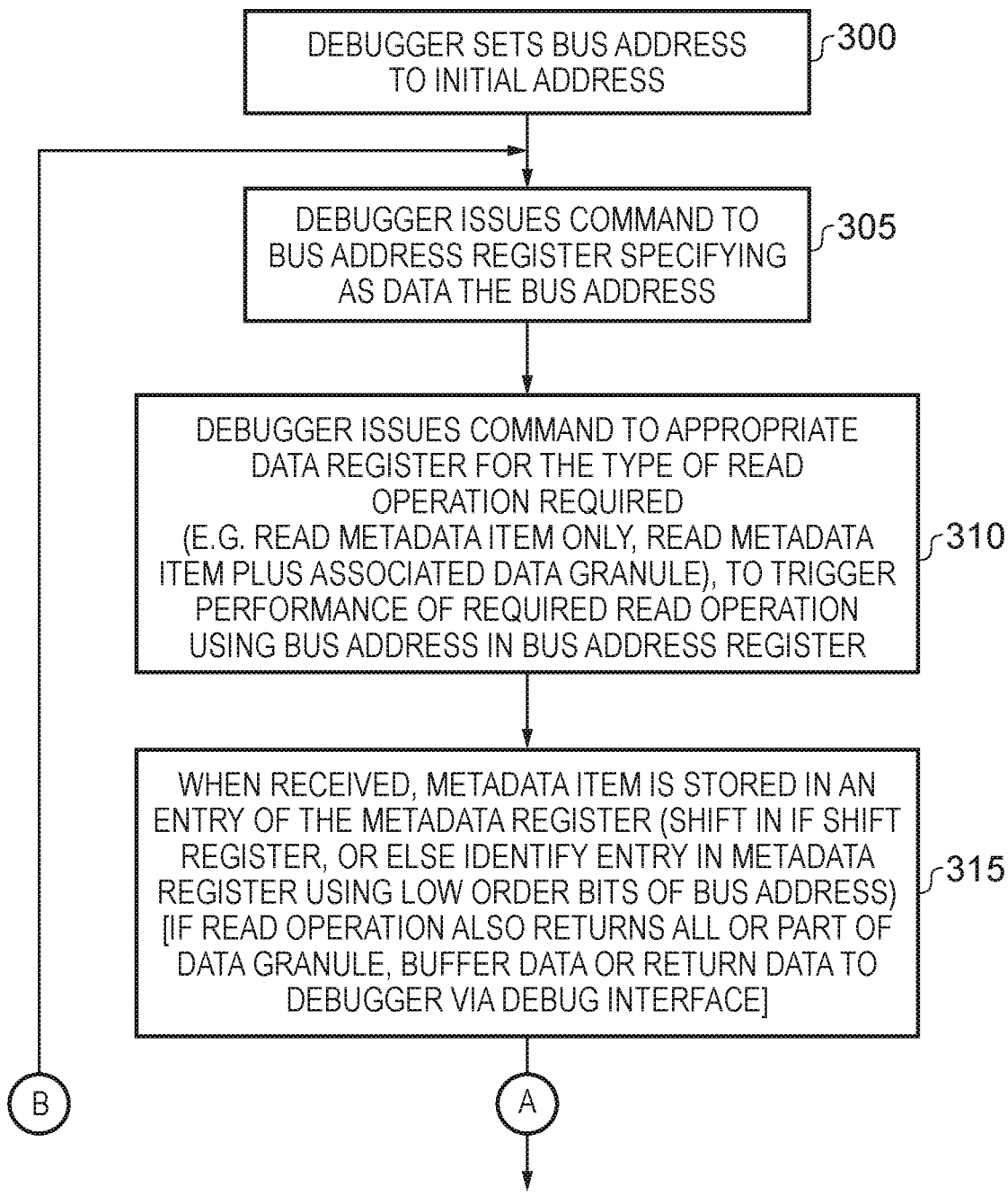
Figure 6B:
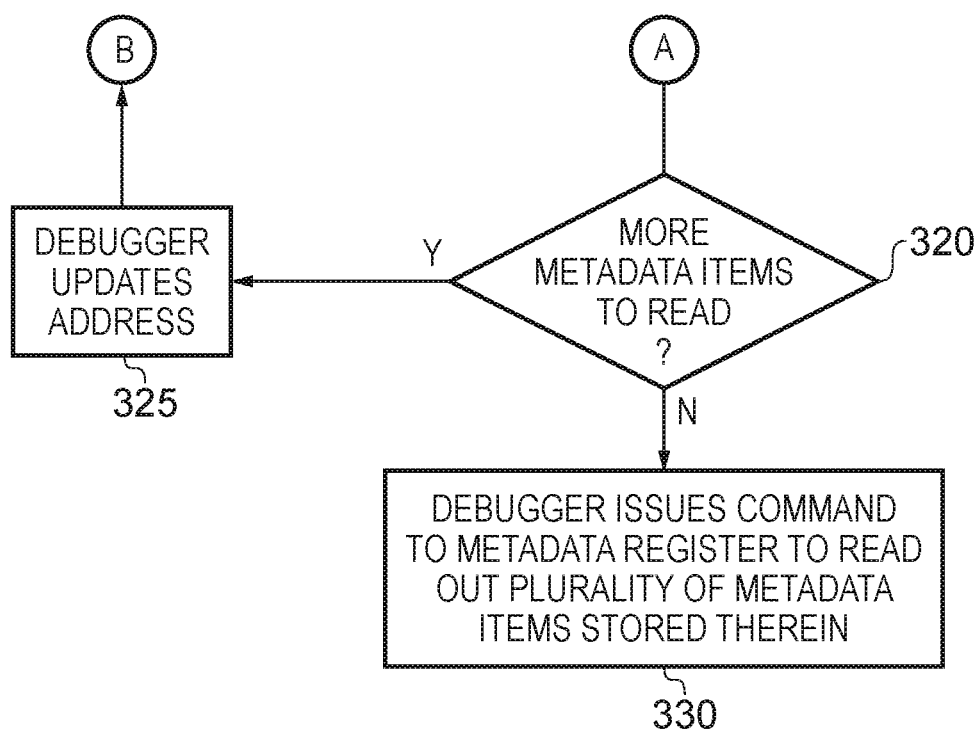
Figure 7A:
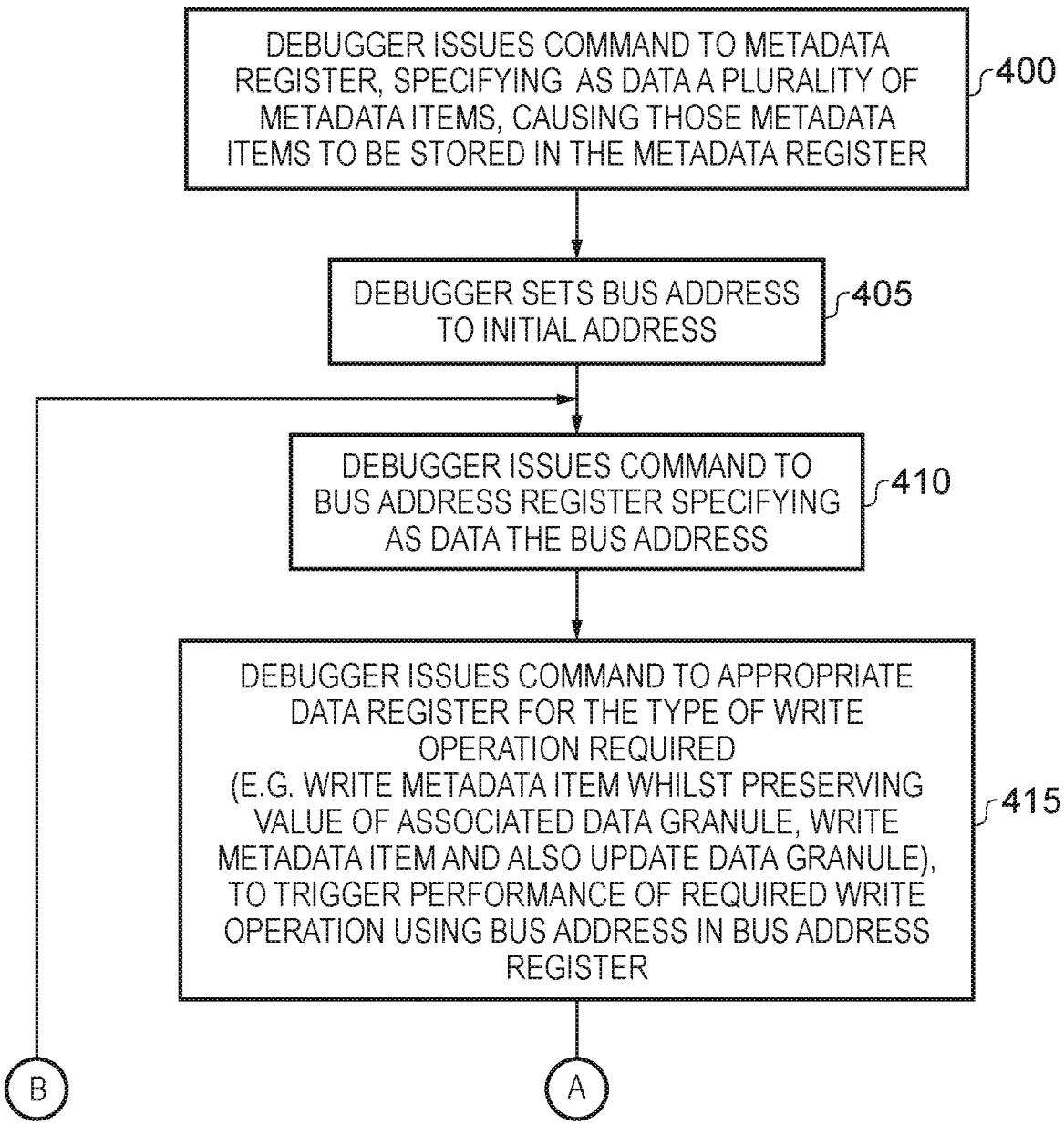
Figure 7B:
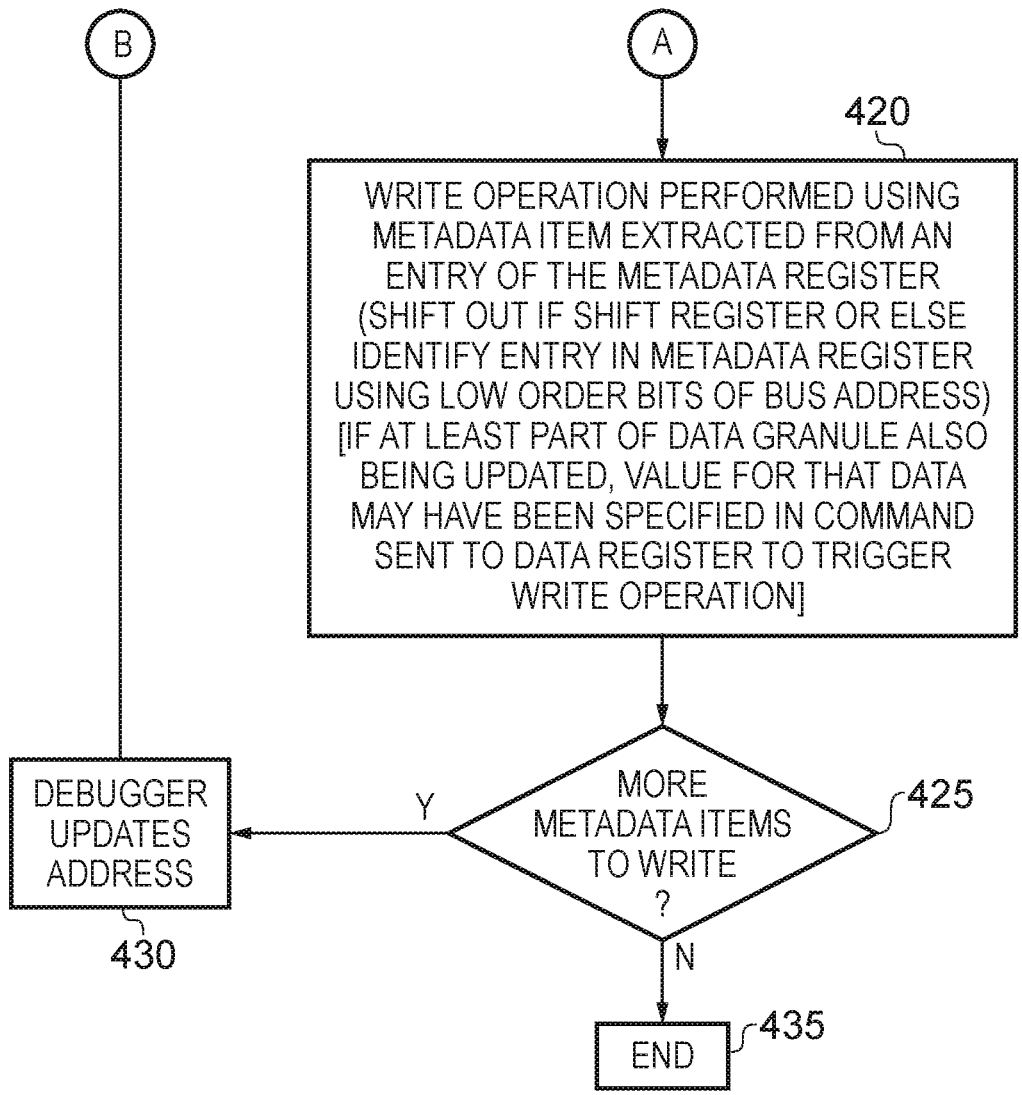
Figure 8A:
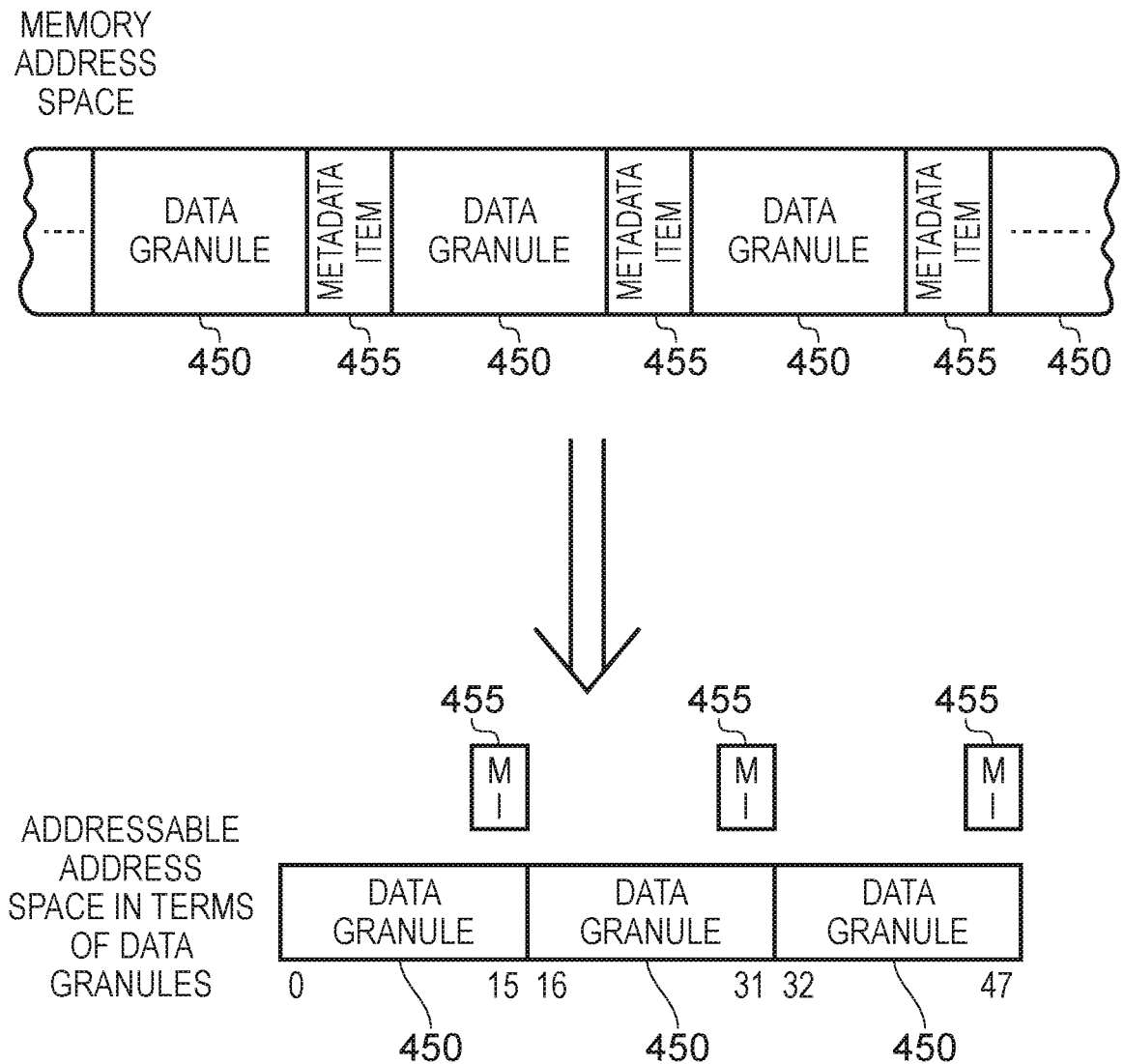
Figure 9:
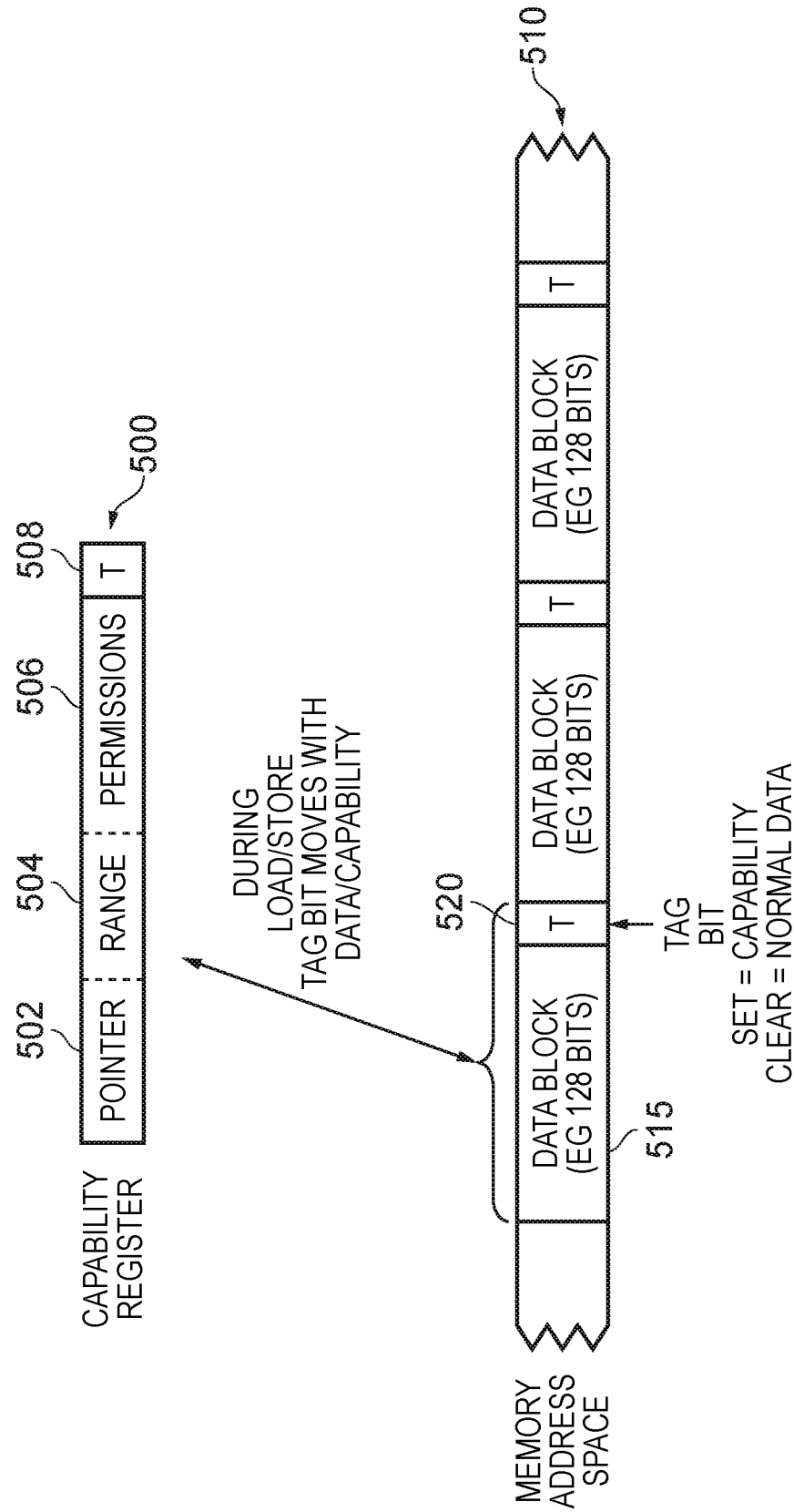
Figure 10:
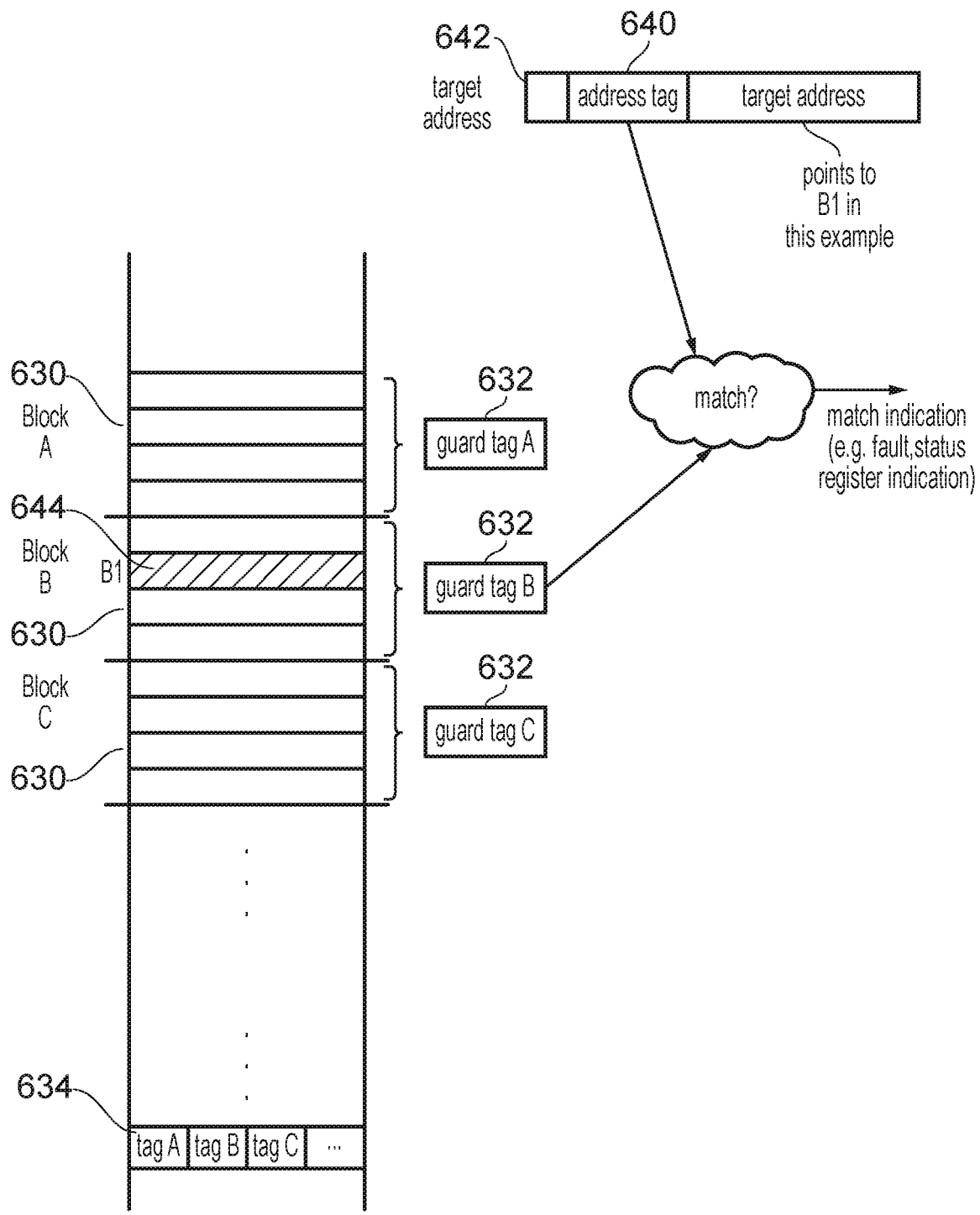
Figure 11:
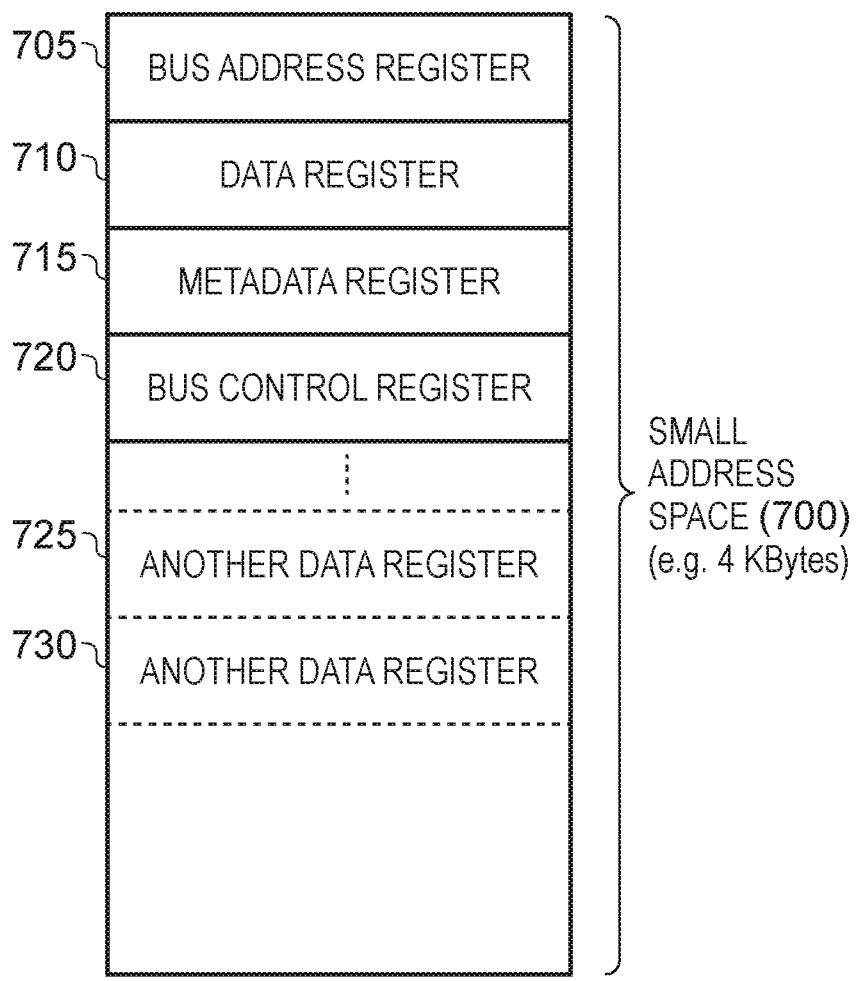

FIGS. 3A and 3B provide a flow diagram illustrating a mechanism for the debugger to read a number of metadata items in accordance with one example arrangement;

FIGS. 4A and 4B provide a flow diagram illustrating a mechanism for the debugger to write to a series of metadata items in accordance with one example arrangement;

FIG. 5 is a block diagram illustrating components provided within the metadata aware memory access port of FIG. 1 in accordance with an alternative arrangement;

FIGS. 6A and 6B provide a flow diagram illustrating how the debugger may read a series of metadata items when using the metadata aware memory access port of FIG. 5;

FIGS. 7A and 7B are a flow diagram illustrating how the debugger may write to a series of metadata items when using the metadata aware memory access port of FIG. 5;

FIGS. 8A and 8B illustrate how metadata items may be provided in association with each data granule;

FIG. 9 illustrates an example arrangement where the metadata items are capability tags;

FIG. 10 illustrates another example arrangement where the metadata items are allocation tags; and FIG. 11 is a diagram schematically illustrating the limited address space available to the debugger via which it may issue commands to the metadata aware memory access port in accordance with one example arrangement.

In accordance with one example arrangement, debug access port circuitry is provided for use by a debugger when performing debugging activities in relation to a device. In particular, the debug access port circuitry has a debug interface to receive commands from the debugger, and a bus interface to couple to a bus in order to enable the debugger to access a memory system of the device. The device is arranged to operate on data formed of data granules having associated metadata items, and the bus interface is arranged to enable communication of both the data granules and the metadata items over the bus between the memory system and the bus interface.

The debug access port circuitry has a plurality of storage elements accessible via the commands issued from the debugger, such that the accesses performed within the memory system via the bus interface are controlled in dependence on the storage elements accessed by the commands. In accordance with the examples described herein, at least one of the storage elements comprises a metadata storage element to store a plurality of metadata items. The debug access port circuitry is then responsive to at least one command from the debugger to perform an access to the memory system in order to transfer at least one of the plurality of metadata items between the metadata storage element and the memory system.

By arranging debug access port circuitry in this way, this provides a mechanism for the debugger to efficiently access the memory system of the device in order to perform access operations on metadata items, without needing to employ processing circuitry within the device to perform the access operations on its behalf. By providing a metadata storage element that can store a plurality of metadata items, the values for a series of metadata items in memory can be read into the metadata storage element using appropriate commands issued by the debugger, or alternatively a series of updated values for metadata items can be stored within the metadata storage element, and then write operations can be triggered by the debugger in order to update values of a series of metadata items stored in the memory system, using the values held in the metadata storage element.

There are a number of ways in which the metadata items to be accessed can be identified by the debugger. In one example arrangement, the debug access port circuitry is arranged so that at least one of the storage elements comprises a memory address storage element to store an indication of the memory address to be accessed. Via a command issued to the memory address storage element, a memory address can hence be stored within the memory address storage element. The debug access port circuitry can then be arranged to reference the memory address storage element to determine a location within the memory system at which to access the at least one of the plurality of metadata items.

The address can take a variety of forms. In one example arrangement, the address is used to identify a particular data granule, and based on that address the associated metadata item's location in memory can be determined, and accordingly can be accessed when the debugger issues a command to trigger a metadata access operation using that address within the memory address storage element.

The number of metadata items accessed in response to each memory access operation triggered by the debugger via the debugger access port circuitry can vary dependent on implementation. For example, it may be possible to access multiple metadata items in response to a single command from the debugger triggering the memory access operation. However, in an alternative approach, each time the debugger issues a command to trigger the memory access operation, a single metadata item may be accessed.

There are a number of ways in which the location to be used within the metadata storage element can be identified for each metadata item being accessed. In one example arrangement, the debug access port circuitry is further arranged to reference the memory address storage element to determine the location within the metadata storage element applicable for a metadata item being accessed. For example, a specified number of low order address bits of the memory address may be used to determine the location within the metadata storage element. Via a series of accesses, each associated with different addresses as identified by the memory address storage element, it is hence possible to identify the applicable location within the metadata storage element for each such access.

When performing read accesses from the memory system in order to retrieve the values of a number of metadata items, then in one example arrangement the obtained value of the metadata item as retrieved from memory can be written into the determined location within the metadata storage element whilst leaving the contents of the other locations within the metadata storage element unchanged. By such an approach, through repeated performance of metadata access operations, each associated with a different address, it is possible to build up within the metadata storage element the read values for multiple metadata items in an efficient manner. The debugger can then subsequently read the contents of the metadata storage element in order to obtain those multiple retrieved metadata item values.

As an alternative to using the memory address indication to identify the appropriate location within the metadata storage element to access for each metadata access operation, the metadata storage element may instead be arranged as a shift register structure. In accordance with such an arrangement, shift operations may be used to add metadata items in to the metadata storage element during read accesses from the memory system, and to output metadata items from the metadata storage element during write accesses to the memory system.

There are a number of ways in which the debugger may trigger accesses to the memory system in order to access metadata items. However, in one example arrangement, the plurality of storage elements further comprises one or more access trigger elements which, when accessed via a command from the debugger, cause an access to the memory system to be initiated by the debug access port circuitry. It should be noted that whilst the access trigger elements may be arranged such that they can store certain data, there is no requirement for them to be organised in such a way, and instead they may merely be arranged such that when they are addressed via a command from the debugger, that triggers the required access to the memory system.

When the access involves accessing not only the metadata item, but also at least a portion of an associated data granule, the value of the data granule (or relevant portion thereof) may temporarily be stored within the access trigger element if desired, but in an alternative arrangement the value of the data granule (or relevant portion thereof) may pass directly through the access trigger element (hence for a write operation the value of the data granule or a portion thereof, may be passed straight through to the bus, whilst for a read operation the read data might be passed from the bus directly to the debugger).

In one example arrangement, multiple different types of access operation may be supported by the debug access port circuitry. In one example configuration, the plurality of storage elements may further comprise a mode control storage element accessible via a command from the debugger to identify a type of access operation to be performed when said one or more access trigger elements are accessed. Hence, in accordance with such an approach, an access trigger element may be a generic element that, when addressed via a command from the debugger, causes an access to the memory system to take place, with the type of access that is performed then being dictated by the current contents of the mode control storage element.

However, in an alternative arrangement, such a mode control storage element may not be used, and instead multiple different access trigger elements may be provided. In particular, in one example arrangement, said one or more access trigger elements may comprise a plurality of access trigger elements, each access trigger element being associated with a different type of access operation, and the debugger is arranged, when issuing a command to initiate an access operation to the memory system, to identify within the command the appropriate access trigger element for the type of access operation to be initiated. Hence, in accordance with this embodiment, different access trigger elements are associated with different types of access operation, and the debugger issues a command to the appropriate access trigger element having regards to the type of access operation that the debugger wishes to perform.

Irrespective of whether a mode control storage element is used, or multiple different access trigger elements are used, the debug access port circuitry can be arranged to initiate, via the bus interface, access operations from a set of supported access operations, in dependence on the commands received from the debugger.

By way of example, the set of supported access operations may comprise one or more of the following write operations: a write operation to update a value of a metadata item using a value obtained from the metadata storage element, and to update a current value of at least a portion of the associated data granule using a data value provided by a command from the debugger; a write operation to update a value of a metadata item using a value obtained from the metadata storage element, whilst preserving a current value of the associated data granule; a write operation to update a value of a metadata item using a value obtained from the metadata storage element, and to update a value of at least a portion of the associated data granule to a known value; a write operation to write at least a portion of a data granule to the memory system, preserving a current value of the associated metadata item; a write operation to write at least a portion of a data granule to the memory system, updating a value of the associated metadata item to a default value.

Hence, it will be appreciated that a wide variety of different types of write operation may be triggered by the debugger via the debug access port circuitry.

As another example, the set of supported access operations may comprise one or more of the following read operations: a read operation to read a metadata item from the memory system and to store the value of that read metadata item in the metadata storage element, and to additionally read at least a portion of the associated data granule from the memory system; a read operation to read a metadata item from the memory system and to store the value of that read metadata item in the metadata storage element, without additionally reading the associated data granule; a read operation to read at least a portion of a data granule from the memory system, without reading the associated metadata item. Hence, it can be seen that the use of the debug access port circuitry also provides a great deal of flexibility to the debugger as to the type of read operations that can be performed.

Each metadata item may comprise one or more bits depending on the form of the metadata. As a specific example, each metadata item may be a capability tag identifying whether the associated data granule specifies a capability. There is increasing interest in capability-based architectures in which certain capabilities are defined for a given process, and an error can be triggered if there is an attempt to carry out operations outside of the defined capabilities. A bounded pointer is an example of a capability. The pointer itself may point to, or be used to determine, the address of a data value to be accessed or an instruction to be executed, for example. However, the pointer may also have associated range information which indicates an allowable range of addresses when using the pointer. This can be useful, for example, for ensuring that the address determined from the pointer remains within certain bounds to maintain security or functional correctness of behaviour. Within such capability-based systems, it is important to know whether any particular data granule relates to a capability or to general purpose data, and the capability tag can be used for this purpose.

As another example of a metadata item, the metadata item may be an allocation tag identifying an allocation policy of the associated data granule. Such an allocation tag can also be referred to as a guard tag. One approach for protecting against certain memory usage errors may be to provide guard tags which are stored in a memory system in association with blocks of one or more memory locations (the data in those one or more memory locations being the data granule). When a tag-guarded memory access operation is requested based on a target address identifying the particular addressed location in the memory system, memory access circuitry may compare an address tag that is associated with the target address with a guard tag that is stored in the memory system in association with a block of one or more memory locations which includes the addressed location identified by the target address. The memory access circuitry may generate an indication of whether a match is detected between the guard tag and the address tag. This indication can be used to control whether the memory access is allowed to succeed or whether subsequent operations can succeed, or could merely be reported while allowing memory accesses to continue as normal.

The debug interface provided by the debug access port circuitry to enable the debugger to issue commands for accessing the memory system can take a variety of forms. However, due to the fact that the accesses to be performed within the memory system are instigated by issuing commands to a relatively small set of storage elements provided by the debug access port circuitry, the debug interface can take a relatively compact form. Purely by way of example, the debug interface may be one of a JTAG, serial wire, or PCI interface.

In one example arrangement, the plurality of storage elements exist within an address space, and a command received at the debug interface identifies a storage element to which that command relates by specifying an address within the address space. This provides an efficient mechanism for identifying the various storage elements.

The plurality of storage elements can take a variety of forms, but in one example arrangement comprise a plurality of registers.

In one example implementation, the debug access port circuitry is responsive to commands from the debugger to initiate, via the bus interface, multiple iterations of an access operation, for each iteration the memory address indication stored in the memory address storage element being incremented.

The amount by which the memory address indication is incremented may in one example implementation vary dependent on the type of access operation being performed. For instance, in one example implementation, when the access operation requires both metadata items and the data to be accessed, the memory address indication is incremented based on an amount of data accessed in a current iteration, in order to provide an address indication for a next iteration. However, when the access operation requires only metadata items to be accessed, the memory address indication may be incremented by n times a data granule size, where n is equal to the number of metadata items accessed in the current iteration, in order to provide an address indication for the next iteration.

Particular examples will now be described with reference to the Figures.

FIG. 1 is a block diagram of a system in accordance with one example configuration. A Debugger 10 is used to perform debug operations in respect of a device. The device can take a variety of different forms, but for the sake of illustration the device in FIG. 1 consists of one or more central processing units (CPUs) 15 connected to memory 35 and some peripheral devices 40 via an interconnect 30. The debugger can establish a number of bus connections to the device via associated memory access ports 20, 25, such a memory access port also being referred to herein as debug access port circuitry. As shown in FIG. 1, a first memory access port 20 is provided via which the debugger can issue commands to cause one or more of the CPUs 15 to perform certain operations. The memory access port 20 is coupled to the CPUs via a bus 22 via which the memory access port can instruct the CPUs to perform certain operations as indicated by the commands received from the debugger, and via which data may flow in both directions between the memory access port and the CPUs.

In accordance with the techniques described herein, an additional memory access port 25 is provided that is metadata aware, and in particular can couple to a bus 27 over which both data granules and associated metadata items may be transported. The metadata aware memory access port 25 provides a mechanism via which the debugger 10 can directly access metadata items stored in memory 35, thus supporting reading of metadata items, and writing to metadata items, directly via the debugger, without needing to initiate metadata access operations within one of the CPUs 15.

Figure 2:
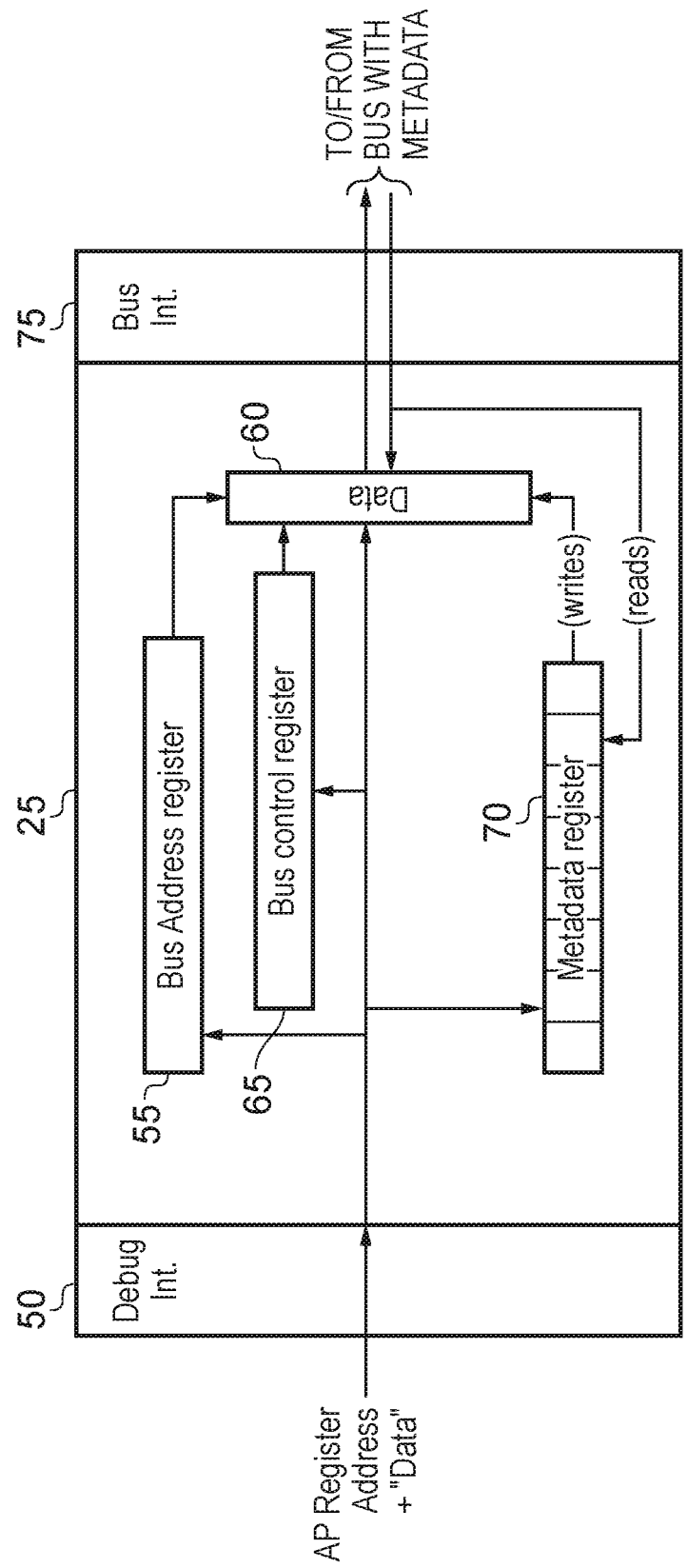
FIG. 2 is a block diagram illustrating components provided within the metadata aware memory access port of FIG. 1 in accordance with one example.

FIG. 2 is a block diagram illustrating in more detail components provided within the metadata aware memory access port 25 in accordance with one example arrangement. The memory access port 25 has a debug interface 50 for coupling to the debugger 10 and a bus interface 75 for coupling to the bus 27. Within the memory access port, a plurality of storage elements are provided that are accessible via the commands issued from the debugger 10. In particular, in the example shown in FIG. 2 the various storage elements take the form of different registers. A small address space is associated with the memory access port, and the commands issued by the debugger can target a particular one of the registers by identifying the address associated with that register. Each command may hence specify an access port (AP) register address, and some accompanying "data". The data can take a variety of forms depending on the register being accessed by the command.

Hence, when the debugger wishes to access an address in memory, so as for example to perform an access in respect of the associated data granule and/or the metadata item associated with that data granule, it may issue a command identifying the bus address register 55, with the data provided with that command being an indication of the address in memory to be accessed. When such a command is issued to the bus address register 55, the bus address register's contents are updated with the data provided by the command, in order to identify the memory address of interest.

A data register 60 can also be provided, and when a command is issued to the data register from the debugger, this triggers the memory access port to initiate an access operation to memory, using the memory address provided within the bus address register 55. For a command used to initiate a write operation, associated write data may be specified, for example to identify an updated value for at least a portion of the data granule to be accessed, and that data may be temporarily buffered within the data register 60 if desired. Alternatively, no data may need to be stored within the data register itself, and instead the data may be passed straight through to the bus, the access to the data register 60 merely being used as a mechanism to trigger performance of the write operation.

Similarly, for a read operation, when the read data pertaining to at least a portion of the targeted data granule is returned to the memory access port 25, it may be temporarily buffered within the data register 60, or alternatively may be passed straight through the access port for return to the debugger 10, in which case again the data register 60 itself is not used to store data, but access to it is merely used to trigger the read operation.

As discussed earlier, in addition to performing read and write operations to data granules within memory, the debugger may wish at certain points in time to access metadata items associated with those data granules. Such accesses may be performed at the same time that the associated data granule is accessed, or alternatively it may be desired to access the metadata items without accessing the associated data granules. To facilitate such metadata access operations, a metadata register 70 is provided that is able to store a plurality of metadata items. The number of metadata items that can be stored within the metadata register will depend on the size of the metadata register, and the number of bits forming each metadata item. In many cases, the metadata items may be significantly smaller than the associated data granules, and indeed each metadata item may only comprise one or a few bits of information. In such instances, it is possible for a significant number of metadata items to be stored within the metadata register, hence allowing bulk access to a whole series of metadata items to take place through the issuance of appropriate commands from the debugger 10 via the metadata aware memory access port 25.

Hence, when it is desired to perform write operations to a series of metadata items, the new values for those metadata items may be stored within the metadata register 70 via the debugger issuing a command to the metadata register 70, where the associated "data" for that command provides the updated values for the series of metadata items. When the metadata register 70 is accessed, those new values for the metadata items will then be stored within corresponding locations within the metadata register.

A series of write operations can then be triggered by issuing a series of commands to the data register 60, and with the contents of the bus address register 55 updated as appropriate to identify the address for each write operation. Whilst in some instances, the debugger may issue separate commands to update the bus address register 55 prior to each write command being issued to the data register 60, in an alternative approach the memory access port may include address incrementing circuitry such that the address within the bus address register 55 may be incremented by a certain amount following each write command, thereby avoiding the need for the debugger to separately issue a command to update the bus address register contents 55 between the performance of each write operation.

The metadata aware memory access port 25 also includes a bus control register 65 which can be accessed via an appropriate command from the debugger, and whose contents are used to identify the type of access operation to be performed when a command is subsequently issued to the data register 60. Hence, the contents of the bus control register can determine whether a write access operation is performed, or a read access operation is performed, and can also identify the type of write or read operation to be performed, for example whether the data granule is to be accessed, the associated metadata item is to be accessed, or whether both the data granule and the associated metadata item are to be accessed.

The address within the bus address register 55 may in one embodiment identify a particular data granule, but that address can also be used to identify the associated metadata item that is to be accessed. Hence, when the data register 60 is contacted by a command from the debugger to initiate a metadata write operation, it can determine the location of the metadata item from the contents of the bus address register 55, and can obtain the updated value for the metadata item from the metadata register 70. A metadata write operation can then be initiated from the memory access port 25 to cause the required metadata item to be updated.

Similarly, for a metadata read operation, the address information in the bus address register 55 can again be used to identify the relevant metadata item, and when the value of that metadata item is returned, it can be routed to the metadata register 70 for storing in an appropriate location within the metadata register.

There are a number of ways in which the appropriate location within the metadata register 70 can be identified for each metadata access operation performed. For example, a certain number of low order bits of the address stored within the bus address register 55 can be used to identify the corresponding location within the metadata register from which a value should be retrieved when performing a metadata write operation, or to which the retrieved value should be stored when performing a metadata read operation. Alternatively, the metadata register can be arranged as a shift register, such that when performing a metadata write operation a certain number of bits representing the updated value of the metadata item can be shifted out, or conversely the bits representing a read metadata item can be shifted into the metadata register 70 when performing a metadata read operation.

FIGS. 3A and 3B provide a flow diagram identifying how the metadata aware memory access port 25 can be used by the debugger to perform bulk reading of metadata items, in accordance with one example arrangement. At step 100, the debugger determines an initial address for the bus address, and then at step 105 issues a command to the bus address register 55 specifying as data that bus address. This causes the bus address register 55 to update its contents in order to identify the initial address.

At step 110, the debugger then issues a command to the bus control register 65 specifying as data the type of read operation to be performed. The read operation can take a variety of forms, and may for example specify that only the metadata item is to be read, or alternatively may identify that both the metadata item and the associated data granule (or at least a portion of that data granule) are to be read.

The debugger then issues a command to the data register 60 to trigger performance of a read operation of the type defined in the bus control register 65. Further, the bus address in the bus address register 55 is used to determine the memory address being accessed. As discussed earlier, the address in the bus address register may identify the data granule location, but can be used to determine also the location within the memory system of the associated metadata item. In particular, as will be discussed in more detail later with reference to FIGS. 8A and 8B, in some example arrangements the metadata items themselves can be semi-hidden, in that they may not be directly addressable by the addresses that can be issued by the CPUs. However, by specifying the appropriate data granule, the corresponding metadata item can be identified and accessed.

At step 120, when the read metadata item is received, that metadata item is then stored in a location of the metadata register 70 (that location also being referred to herein as an entry). When the metadata register 70 is arranged as a shift register, this can occur by shifting in the read metadata value into the metadata register. Alternatively, if the metadata register is not arranged as a shift register, a certain number of low order bits of the bus address in the bus address register 55 can be used to identify the appropriate location within the metadata register to which the read metadata item should be stored. When updating the metadata register in this way, the update process will typically be arranged so that none of the other locations are affected, and retain their current contents.

As indicated in step 120, if the read operation also returns all or part of a data granule, then that read data can if desired be temporarily buffered within the data register 60, prior to returning to the debugger via the debug interface 50. Alternatively, it could be returned directly to the debugger via the debug interface 50 without being buffered within the data register 60.

Whilst in FIG. 3A it is assumed that separate commands are issued at steps 105, 110 and 115, in an alternative implementation some or all of steps 105 to 120 may be performed in response to a single command issued by the debugger, for example where the address, control and access command form a single packet.

Following step 120, the process then proceeds to step 125 where it is determined whether there are more metadata items to be read. The debugger can control the number of metadata items read, but in one example arrangement it may wish to read a sufficient number of metadata items to fully populate the metadata register 70, with that fully populated metadata register 70 then being interrogated in order to retrieve the values of all of the read metadata items.

If at step 125 it is determined that there are more metadata items to read, then in one example arrangement the debugger may determine an updated address at step 130. However, in an alternative arrangement, the memory access port 25 may incorporate some address incrementing logic that can automatically update the contents of the bus address register 55 following performance of the read operation, hence making step 130 redundant. If step 130 is performed, then the process will return to step 105, where the updated address determined by the debugger is written into the bus address register 55. On this next iteration step 110 may not be necessary. However, if the bus address register contents are updated automatically by the memory access port, then the yes path from step 125 may return directly to step 115 of FIG. 3A, assuming the same type of read command is to be performed on the next iteration and hence step 110 does not need to be re-performed.

The amount by which the address within the bus address register 55 needs to be incremented when it is determined at step 125 that there are more metadata items to read will depend on the number of metadata items accessed by the current read operation. If a single metadata item is accessed, then the address may for example be updated such that it is incremented by the data granule size. However, if multiple metadata items are accessed, then the address may incremented by multiples of the data granule size.

Further, if data is being accessed in addition to metadata items, a single data access may access less than the granule size. As a result, the address may then be incremented by less than the granule size, and in particular may be incremented only by the size of the data accessed. The address may hence stay within the same granule for the next iteration and the subsequent access will then access the same metadata item.

Once it is determined at step 125 that there are no more metadata items to read, then the process can proceed to step 135 where the debugger may issue a command to the metadata register 70 in order to read out the plurality of metadata items stored therein.

FIGS. 4A and 4B provide a flow diagram to illustrate the steps that may be performed to enable the debugger to perform a bulk write of metadata items using the metadata aware memory access port of FIG. 2. At step 200, the debugger issues a command to the metadata register 70, specifying as data values for a plurality of metadata items, causing those metadata item values to be stored in the metadata register. Steps 205, 210, 215 and 220 then correspond to steps 100, 105, 110 and 115 of FIG. 3A. However, at step 215 the data provided with the command issued to the bus control register will identify the type of write operation to be performed, for example whether the write operation is to perform a write of a metadata item whilst preserving the value of the associated data granule, or instead is to perform a write of a metadata item and also a write to update at least part of the data granule.

Whilst in FIG. 4A it is assumed that separate commands are issued at steps 210, 215 and 220, in an alternative implementation some or all of steps 210 to 220 may be performed in response to a single command issued by the debugger, for example where the address, control and access command form a single packet.

Once a command has been issued to the data register 60 at step 220 to trigger performance of the write operation, then at step 225 the write operation is performed using a metadata item extracted from an entry of the metadata register. As with the earlier discussed read operation, a certain number of low order bits of the address stored in the bus address register 55 can be used to identify the appropriate entry within the metadata register in one example arrangement. However, in another example arrangement where the metadata register is arranged as a shift register, the relevant metadata item value can be obtained by shifting out a certain number of bits from the shift register, the number of bits shifted out from the shift register depending on the number of bits forming each metadata item.

Further, if at least part of the data granule is also being updated as part of the write operation then the value of that data can be specified in the command that is sent to the data register 60 to trigger the write operation, with that write data being temporarily buffered in the data register 60 if desired. Alternatively that write data may be passed straight through to the bus 27 without being buffered within the data register 60.

At step 230, it is determined whether there are more metadata items to write. The debugger will typically determine the number of metadata items that it wishes to perform a write operation in respect of, but in one example arrangement may wish to update a number of metadata items equal to the number of separate metadata items that can be stored within the metadata register 70, and accordingly it will be determined that there are more metadata items to write if there is at least one as yet unused metadata item value within the metadata register 70.

If it is determined that there are more metadata items to write, then at step 235 the debugger may determine an updated address, prior to the process returning to step 210. On this next iteration, step 215 may not be necessary. However, in an alternative arrangement, the memory access port 25 may include incrementing circuitry to automatically increment the address within the bus address register 55 following performance of the write operation, hence avoiding the need for step 235, in which event the process may return directly to step 220 of FIG. 4A, assuming the same type of write command is to be performed on the next iteration and hence step 215 does not need to be re-performed.

FIG. 5 illustrates an alternative arrangement for the metadata aware memory access port, where the need for the bus control register 65 may be avoided. As shown in FIG. 5, the metadata aware memory access port 25' includes the bus address register 55 and metadata register 70 as per FIG. 2, and also includes the debug interface 50 and bus interface 75. However, a plurality of data registers 250 are provided, one data register being associated with each type of access operation that is supported. In accordance with such an approach, the bus control register 65 is not needed, and instead the debugger issues a command to the particular data register associated with the memory access that is required. Hence, there may be a number of data registers associated with different types of write commands and a number of data registers associated with different types of read commands. At least some of those write and read commands will involve performing write operations or read operations in respect of metadata items, and the metadata items can be accessed in the metadata register 70 in the same way as discussed earlier with reference to FIG. 2.

FIGS. 6A and 6B provide a flow diagram analogous to that of FIGS. 3A and 3B, but when using the form of metadata aware memory access port 25' as shown in FIG. 5. Steps 300 and 305 correspond to steps 100 and 105 of FIG. 3A. Then, at step 310, the debugger issues a command to the appropriate data register for the type of read operation required in order to trigger performance of that required read operation using the bus address stored in the bus address register 55. Hence, it can be seen that a single command needs to be issued at this step, rather than one command being issued to the bus control register, followed by another command being issued to the data register.

Steps 315, 320, 325 and 330 then correspond to steps 120, 125, 130 and 135 of FIGS. 3A and 3B. In the event that the updating of the address between each iteration occurs automatically within the memory access port 25', then the yes path from step 320 can return to step 310 rather than to step 305.

FIGS. 7A and 7B provide a flow diagram corresponding to the flow diagram of FIGS. 4A and 4B, but describe how a bulk writing of metadata items may be performed when utilising the metadata aware memory access port 25' of FIG. 5. Steps 400, 405 and 410 correspond to steps 200, 205 and 210 of FIG. 4A. At step 415, the debugger then issues a command to the appropriate data register for the type of write operation required, in order to trigger performance of that required write operation using the bus address in the bus address register. This hence avoids the need for issuing separate commands to a bus control register, and then subsequently to a data register.

Steps 420, 425, 430 and 435 then correspond to steps 225, 230, 235 and 240 of FIG. 4B. If the address is adjusted automatically within the memory access port 25' between each iteration, avoiding the need for step 430, then the yes path from step 425 can return directly to step 415.

FIG. 8A illustrates the memory address space and the presence of the various data granules 450 and associated metadata items 455 within that address space. However, in one example arrangement the metadata items themselves are not directly addressable, and accordingly can be viewed as semi-hidden. Instead, as illustrated in the lower figure in FIG. 8A, the addressable address space is specified in terms of the data granules. In this example, a byte address of 0 will cause the first data granule to be accessed, a byte address of 16 will cause the second data granule to be accessed, etc. However, metadata items 455 are associated with each data granule. Then, when the metadata access operation is used, whilst the address still identifies a data granule, that address can be used to identify the corresponding metadata item 455 of interest, and cause that metadata item to be accessed.

FIG. 8B illustrates two specific example forms of metadata items. In both examples, it is assumed that the data granules are 16 bytes in size, but in other implementations the data granule size can differ. In accordance with the capabilities example, each data granule of 16 bytes has an associated one bit of metadata, also referred to herein as a capability tag, which is used to identify whether the associated data granule identifies a capability, or merely identifies general purpose data.

The second example in FIG. 8B illustrates allocation tagging, where in the particular example shown 4 bits of metadata are associated with each 16 byte granule. These 4 bits of metadata can be referred to as allocation tags, also referred to herein as guard tags. When an access request is made to a particular location in memory, an address tag can be specified in association with the target address, and that address tag can be compared with the allocation tag associated with the relevant data granule in memory. Different actions can be taken dependent on whether a match is detected between the guard tag and the address tag.

The metadata items can take a variety of forms, but two examples are discussed hereafter with reference to FIGS. 9 and 10.

FIG. 9 schematically illustrates how a tag bit is used in association with individual data blocks to identify whether those data blocks represent a capability (in this case a bounded pointer and associated restrictions information), or represent normal data. In particular, the memory address space 510 in a capability-aware system may store a series of data blocks 515, which typically will have a specified size. Purely for the sake of illustration, it is assumed in this example that each data block comprises 128 bits. In association with each data block 515, there is provided a tag field 520, which in one example is a single bit field referred to as the tag bit, which is set to identify that the associated data block represents a capability, and is cleared to indicate that the associated data block represents normal data, and hence cannot be treated as a capability. It will be appreciated that the actual value associated with the set or the clear state can vary dependent on embodiment, but purely by way of illustration, in one embodiment if the tag bit has a value of 1, it indicates that the associated data block is a capability, and if it has a value of 0 it indicates that the associated data block contains normal data.

When a capability is loaded into a bounded pointer register (also referred to herein as a capability register), such as the capability register 500 shown in FIG. 9, then the tag bit moves with the capability information. Accordingly, when a capability is loaded into the capability register 500, the pointer 502, range information 504 and restrictions information 506 (also referred to as the permissions information) will be loaded into the capability register. In addition, in association with that capability register, or as a specific bit field within it, the tag bit 508 will be set to identify that the contents represent a capability. Similarly, when a capability is stored back out to memory, the relevant tag bit 520 will be set in association with the data block in which the capability is stored. By such an approach, it is possible to distinguish between a capability and normal data, and hence ensure that normal data cannot be used as a capability.

As another example of metadata items to which the present techniques can be applied, FIG. 10 schematically illustrates a concept of tag-guarded memory accesses (guard tags also being referred to herein as allocation tags). The physical address space used to refer to memory locations within the memory system may be logically partitioned into a number of blocks 630 each comprising a certain number of addressable locations. For conciseness, in the example of FIG. 10, each block 630 comprises four memory locations, but other block sizes could be used as well. Each block 630 is associated with a corresponding guard tag 632. The guard tags associated with a certain number of blocks 630 can be gathered together and stored either within a different architecturally accessible memory location 634 within the physical address space, or within additional storage locations provided in main memory which are not architecturally accessible (not mapped to the same physical address space). The use of separate non-architecturally accessible storage may in some cases be preferred to avoid using up space in data caches for caching guard tag values, which could impact on the performance of the regular code and could make coherency management more complex. An additional tag cache could be provided in the processing circuitry 15 for caching tag values from the non-architecturally accessible storage, for faster access than if the tags had to be accessed from main memory.

The particular mapping of which tag storage locations 634 correspond to each block 630 may be controlled by the load/store unit of the processing circuitry 15 and could be hardwired or could be programmable. Alternatively the memory system 35 may determine where the tags are stored and the processing circuitry need not know or care. While in FIG. 10 each tag 632 is associated with a block of physical addresses, it would also be possible to provide guard tags 632 associated with virtual memory locations in a virtual memory address space, but this may require some additional address translations on each memory access. Hence by associating the guard tag 632 with physical memory locations this can improve performance. In general it is a choice for the particular implementation exactly how the guard tags 632 are associated with the corresponding blocks 630 of the physical address space. In general, all that is required is that the guard tag 632 associated with a given block of memory can be accessed and compared.

Hence, when a tag-guarded memory access is required, an address tag 640 (which is associated with the target address 642 identifying the addressed location 644 to be accessed), is compared against the guard tag 632 which is associated with the block of memory locations 630 which includes the addressed location 644. For example, in FIG. 10 the target address 642 points to a certain location B1 in memory, marked 644 in the address space of FIG. 10. Therefore the guard tag B which is associated with the block of locations B including location B1 is compared against the address tag 640 associated with a target address 642. As shown in the top of FIG. 10, the address tag 640 may be determined as a function of selected bits of the target address itself. In particular, the address tag may be determined from bits within a portion of the target address which is unused for indicating the specific memory location which is to be selected as the addressed location 644. For example, in some implementations the top portion of bits of the target address may always have a certain fixed value such as a sign extension (all 0s or all 1s) and so an address can be tagged with the address tag 640 by overwriting these unused bits with an arbitrary tag value. The particular address tag value can be selected by a programmer or compiler for example. The address tag and guard tag 632 can be a relatively small number of bits, e.g. 4 bits, and so need not occupy much space within the memory and within the target address. Providing 4 bits of tag space, i.e. 16 possible values of the tags, can often be enough to detect many common types of memory access errors.

Hence, when a tag-guarded memory access is performed by any of the CPUs 15, the load/store unit of that CPU 15 compares the address tag 640 and the guard tag 632 associated with a block 630 including the addressed location 644, and determines whether they match (alternatively the tag comparison may be performed within the memory system 35). The load/store unit generates a match indication indicating whether the address tag 640 and the guard tag 632 matched. For example, this match indication could be a fault signal which is generated if there is a mismatch between the address tag 640 and the guard tag 632, or an indication placed in a status register indicating whether there was a match, or an entry added to an error report to indicate the address for which the error was detected and/or the instruction address of the instruction which triggered the error.

By using a memory access port of the form discussed with reference to FIG. 2 or 5, a relatively small address space can be made available to the debugger, such as the address space 700 shown in FIG. 11. Via that small address space, the debugger can issue commands that can cause accesses to be performed to a much larger address space in the memory 35 of the device being debugged, and further can specify a wide variety of different types of access operation to be performed. As illustrated schematically in FIG. 11, different addresses within the address space 700 can be used to identify the different registers within the memory access port. For example an address 705 specified in a command may identify the bus address register 55, another address 710 may identify the data register 60, a further address 715 may identify the metadata register 70, whilst a yet further address 720 may identify the bus control register 65.

When using the alternative approach of FIG. 5, where the bus control register is not used, then a variety of different addresses, 710, 725, 730 may be used to identify the different data registers that commands can be issued to.

Due to the small address space 700 required, a relatively simple interface can be provided between the debugger 10 and the memory access port 25. For example, the debug interface may be formed of either a JTAG, serial wire or PCI interface, or any other suitable interface.

Whilst in FIG. 11 the address space is shown by way of specific example as being 4 Kbytes in size, it will be appreciated that the address space in other implementations could be of a different size. Indeed, it is possible in some implementations for the address size to be significantly smaller than that, for example 256 bytes may be sufficient.

From the above description of various example configurations, it will be appreciated that the techniques described herein provide an efficient mechanism for a debugger to directly initiate memory accesses, in a manner that allows metadata items to be accessed within memory in addition to, or instead of, the associated data granules. The required access operations can then be performed efficiently and atomically where needed, without needing to halt processing on the processing circuitry of the device. In particular, through the use of the metadata aware memory access port described herein, the debugger can access metadata items in memory without needing to use processing circuitry of the device to perform the necessary metadata access operations.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. Debug access port circuitry comprising:
a debug interface to receive commands from a debugger;
a bus interface to couple to a bus to enable the debugger to access a memory system of a device, the device operating on data formed of data granules having associated metadata items stored in the memory system, and the bus interface enabling communication of both the data granules and the metadata items over the bus between the memory system and the bus interface;
a plurality of storage elements accessible via the commands issued from the debugger, such that accesses performed within the memory system via the bus interface are controlled in dependence on the storage elements accessed by the commands;

at least one of the storage elements comprising a metadata storage element to store a plurality of metadata items; and wherein the debug access port circuitry is responsive to at least one command from the debugger to perform an access to the memory system, the access comprising transferring at least one of the plurality of metadata items between the metadata storage element and the memory system.

2. Debug access port circuitry as claimed in claim 1, wherein:
at least one of the storage elements comprises a memory address storage element to store an indication of a memory address to be accessed; and
the debug access port circuitry is arranged to reference the memory address storage element to determine a location within the memory system at which to access the at least one of the plurality of metadata items.

3. Debug access port circuitry as claimed in claim 2, wherein the debug access port circuitry is further arranged to reference the memory address storage element to determine a location within the metadata storage element used for the at least one of the plurality of metadata items.

4. Debug access port circuitry as claimed in claim 3, wherein a specified number of low order address bits of the memory address are used to determine the location within the metadata storage element.

5. Debug access port circuitry as claimed in claim 3, wherein during a read access from the memory system a metadata item retrieved from the memory system is written to the determined location within the metadata storage element whilst leaving content of other locations within the metadata storage element unchanged.

6. Debug access port circuitry as claimed in claim 2, wherein the debug access port circuitry is responsive to commands from the debugger to initiate, via the bus interface, multiple iterations of an access operation, for each iteration the memory address indication stored in the memory address storage element being incremented.

7. Debug access port circuitry as claimed in claim 6, wherein:
when the access operation requires both metadata items and the data to be accessed, the memory address indication is incremented based on an amount of data accessed in a current iteration, in order to provide an address indication for a next iteration; and
when the access operation requires only metadata items to be accessed, the memory address indication is incremented by n times a data granule size, where n is equal to the number of metadata items accessed in the current iteration, in order to provide an address indication for the next iteration.

8. Debug access port circuitry as claimed in claim 1, wherein the metadata storage element is arranged as a shift register structure such that shift operations are used to add metadata items into the metadata storage element during read accesses from the memory system, and to output metadata items from the metadata storage element during write accesses to the memory system.

9. Debug access port circuitry as claimed in claim 1, wherein the plurality of storage elements further comprises one or more access trigger elements which, when accessed via a command from the debugger, cause an access to the memory system to be initiated by the debug access port circuitry.

10. Debug access port circuitry as claimed in claim 9, wherein the plurality of storage elements further comprises a mode control storage element accessible via a command from the debugger to identify a type of access operation to be performed when said one or more access trigger elements are accessed.

11. Debug access port circuitry as claimed in claim 9, wherein said one or more access trigger elements comprise a plurality of access trigger elements, each access trigger element being associated with a different type of access operation, and the debugger is arranged, when issuing a command to initiate an access operation to the memory system, to identify within the command the appropriate access trigger element for the type of access operation to be initiated.

12. Debug access port circuitry as claimed in claim 1, wherein the debug access port circuitry is arranged to initiate, via the bus interface, access operations from a set of supported access operations, in dependence on the commands received from the debugger.

13. Debug access port circuitry as claimed in claim 12, wherein the set of supported access operations comprises one or more of the following write operations:
a write operation to update a value of a metadata item using a value obtained from the metadata storage element, and to update a current value of at least a portion of the associated data granule using a data value provided by a command from the debugger;
a write operation to update a value of a metadata item using a value obtained from the metadata storage element, whilst preserving a current value of the associated data granule;
a write operation to update a value of a metadata item using a value obtained from the metadata storage element, and to update a value of at least a portion of the associated data granule to a known value;
a write operation to write at least a portion of a data granule to the memory system, preserving a current value of the associated metadata item;
a write operation to write at least a portion of a data granule to the memory system, updating a value of the associated metadata item to a default value.

14. Debug access port circuitry as claimed in claim 12, wherein the set of supported access operations comprises one or more of the following read operations:
a read operation to read a metadata item from the memory system and to store the value of that read metadata item in the metadata storage element, and to additionally read at least a portion of the associated data granule from the memory system;
a read operation to read a metadata item from the memory system and to store the value of that read metadata item in the metadata storage element, without additionally reading the associated data granule;
a read operation to read at least a portion of a data granule from the memory system, without reading the associated metadata item.

15. Debug access port circuitry as claimed in claim 1, wherein each metadata item comprises one or more bits.

16. Debug access port circuitry as claimed in claim 1, wherein each metadata item is a capability tag identifying whether the associated data granule specifies a capability.

17. Debug access port circuitry as claimed in claim 1, wherein each metadata item is an allocation tag identifying an allocation policy of the associated data granule.

18. Debug access port circuitry as claimed in claim 1, wherein the debug interface is one of a JTAG, serial wire, or PCI interface.

19. Debug access port circuitry as claimed in claim 1, wherein the plurality of storage elements exist within an address space, and a command received at the debug interface identifies a storage element to which that command relates by specifying an address within the address space.

20. Debug access port circuitry as claimed in claim 1, wherein the plurality of storage elements comprise a plurality of registers.

21. A method of operating debug access port circuitry comprising:
    receiving commands from a debugger;
    providing a bus interface to couple to a bus to enable the debugger to access a memory system of a device, the device operating on data formed of data granules having associated metadata items stored in the memory system, and the bus interface enabling communication of both the data granules and the metadata items over the bus between the memory system and the bus interface;
    providing a plurality of storage elements accessible via the commands issued from the debugger, such that accesses performed within the memory system via the bus interface are controlled in dependence on the storage elements accessed by the commands;
    providing at least one of the storage elements as a metadata storage element to store a plurality of metadata items; and
    performing, in response to at least one command from the debugger, an access to the memory system, the access comprising transferring at least one of the plurality of metadata items between the metadata storage element and the memory system.

22. Debug access port circuitry comprising:
    means for receiving commands from a debugger;
    means for coupling to a bus to enable the debugger to access a memory system of a device, the device operating on data formed of data granules having associated metadata items stored in the memory system, and the means for coupling enabling communication of both the data granules and the metadata items over the bus between the memory system and the means for coupling;
    a plurality of storage elements accessible via the commands issued from the debugger, such that accesses performed within the memory system via the means for coupling are controlled in dependence on the storage elements accessed by the commands;
    at least one of the storage elements comprising a metadata storage element for storing a plurality of metadata items; and
    wherein the debug access port circuitry is responsive to at least one command from the debugger to perform an access to the memory system, the access comprising transferring at least one of the plurality of metadata items between the metadata storage element and the memory system.

* * * * *